United States Patent
Allegorico et al.

(10) Patent No.: US 10,675,579 B2
(45) Date of Patent: Jun. 9, 2020

(54) METHOD AND SYSTEM FOR PREDICTING RESIDUAL USEFUL LIFE OF AN AIR FILTER

(71) Applicant: Nuovo Pignone Srl, Florence (IT)

(72) Inventors: Carmine Allegorico, Florence (IT); Claudio Antonini, Florence (IT); Marco Santini, Florence (IT); Giorgio Marchetti, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 57 days.

(21) Appl. No.: 15/533,208

(22) PCT Filed: Nov. 26, 2015

(86) PCT No.: PCT/EP2015/077758
§ 371 (c)(1),
(2) Date: Jun. 5, 2017

(87) PCT Pub. No.: WO2016/087302
PCT Pub. Date: Jun. 9, 2016

(65) Prior Publication Data
US 2017/0320004 A1  Nov. 9, 2017

(30) Foreign Application Priority Data
Dec. 5, 2014  (IT) ................ FI2014A0266

(51) Int. Cl.
*G06F 11/30* (2006.01)
*B01D 46/00* (2006.01)
(Continued)

(52) U.S. Cl.
CPC ....... *B01D 46/0086* (2013.01); *B01D 46/446* (2013.01); *F01D 21/003* (2013.01);
(Continued)

(58) Field of Classification Search
CPC ................................ B01D 46/0086
See application file for complete search history.

(56) References Cited

U.S. PATENT DOCUMENTS

| | | | | |
|---|---|---|---|---|
| 5,036,698 A | * | 8/1991 | Conti | B01D 46/0086 116/DIG. 25 |
| 7,261,762 B2 | * | 8/2007 | Kang | B01D 46/0086 116/DIG. 25 |

(Continued)

FOREIGN PATENT DOCUMENTS

| | | |
|---|---|---|
| DE | 102 06 767 A1 | 9/2003 |
| EP | 2 557 305 A2 | 2/2013 |

OTHER PUBLICATIONS

Italian Search Report and Written Opinion issued in connection with corresponding IT Application No. FI2014A000266 dated Jul. 21, 2015.

(Continued)

*Primary Examiner* — Phuong Huynh
(74) *Attorney, Agent, or Firm* — Baker Hughes Patent Organization

(57) ABSTRACT

A method for predicting the residual useful life of an air filter arrangement is described. The method includes the following steps: providing a plurality of predetermined reference degradation curves; measuring a degradation parameter of the filter arrangement; and estimating the residual useful life of the filter arrangement by comparing the predetermined reference degradation curves and an actual degradation curve defined by measured values of the degradation parameter.

21 Claims, 4 Drawing Sheets

(51) Int. Cl.
  *B01D 46/44*   (2006.01)
  *F01D 21/00*   (2006.01)
  *F02C 7/052*   (2006.01)
  *G01N 15/08*   (2006.01)
  *G01M 15/14*   (2006.01)

(52) U.S. Cl.
  CPC ......... *F02C 7/052* (2013.01); *G01N 15/0806* (2013.01); *B01D 2273/18* (2013.01); *B01D 2279/60* (2013.01); *F05D 2220/32* (2013.01); *G01M 15/14* (2013.01); *G01N 2015/084* (2013.01)

(56) References Cited

U.S. PATENT DOCUMENTS

| | | |
|---|---|---|
| 2008/0223123 A1 | 9/2008 | Wang et al. |
| 2011/0238331 A1 | 9/2011 | Moore et al. |
| 2018/0200657 A1* | 7/2018 | Soldi .................. B01D 46/0086 |

OTHER PUBLICATIONS

International Search Report and Written Opinion issued in connection with corresponding PCT Application No. PCT/EP2015/077758 dated Feb. 3, 2016.
International Preliminary Report on Patentability issued in connection with corresponding PCT Application No. PCT/EP2015/077758 dated Jun. 6, 2017.

* cited by examiner

METHOD AND SYSTEM FOR PREDICTING RESIDUAL USEFUL LIFE OF AN AIR FILTER

BACKGROUND

The present disclosure relates to air filters and filtering chambers. More particularly, embodiments disclosed herein relate to filter chambers for gas turbine engines and to methods and systems for determining the residual useful life of filter media.

Power generation equipment, such as a gas turbine engine, uses a large amount of intake air to support the combustion process. Impure air laden with dust particles, salt, and other types of contaminants, however, may damage the compressor blades, the turbine blades and buckets and other types of power plant equipment components via corrosion, erosion, fouling and the like. Such component damage or fouling may reduce the life expectancy and negatively affect the performance of the overall gas turbine engine.

To combat the effect of contaminants on gas turbine efficiency and reduce potential damages to the turbomachinery components, filtration systems are typically used to remove particulate matter from the intake air stream. These systems may feature filter media on the upstream side of a compressor in order to capture particulate matter before it reaches compressor and the combustor of the gas turbine engine. Although effective, during long periods of operation the filter media may become saturated with particulate matter, which subsequently obstructs or impedes the flow of air and creates a significant pressure drop between the upstream and downstream side of the filter media. Therefore, periodic cleaning of the filter may be necessary.

Reverse pulse cleaning systems are known in the art for removing particulate matter from saturated filter media. These systems typically have a nozzle downstream of the filter and connected to an air supply. Cleaning air is provided to the nozzle by the air supply. The nozzle generates a pressure sound wave that generates a vibration that shocks the filter media of the filter cartridge causing the dust fall. Exhausted filters can thus to some extent be cleaned without requiring dismantling and replacement. However, at some point in time filters must be replaced. Moreover, some kinds of filter media are not suitable for reverse pulse cleaning and must be simply removed and replaced with fresh filters once saturated with particulate matter.

In some cases replacement requires shutdown of the gas turbine engine for a considerably long time interval. In any event replacement of a filter arrangement is a complex maintenance operation, which should require careful programming. An estimation of the residual useful life of a filter arrangement would be of great assistance in suitably programming a maintenance intervention of this kind.

The behavior of the filter arrangement during time and thus its residual useful life depend upon a plurality of factors, not all of which can be measured or known. For instance, existing methods for estimating the residual useful life of filters require an accurate model of the degradation phenomenon and a number of difficult-to-measure or unknown parameters, such as the air flow rate, environmental data, etc. These methods additionally, hardly adapt to changing operating conditions. Additional difficulties are caused by the large variability of filter duration, which depends upon several factors, such as the operating conditions, the contaminants present in the air, the type of filter cartridges used, etc.

There is therefore a need for a method which provides an accurate and efficient estimation of the residual useful life of a filter arrangement.

SUMMARY OF THE INVENTION

Disclosed hereunder is a novel method which allows accurate estimation of the residual useful life of a filter arrangement and which overcomes or alleviates one or more of the limitations of the known methods.

The method for predicting the residual useful life of an air filter arrangement is provided, wherein the residual useful life of the filter arrangement is determined on a trajectory-based similarity prediction procedure or algorithm, using a plurality of predetermined reference degradation curves.

According to embodiments disclosed herein, the method comprises the following steps: providing a plurality of reference degradation curves; measuring a degradation parameter of the filter arrangement; estimating the residual useful life of the filter arrangement by comparing the reference degradation curves and an actual degradation curve defined by measured values of the degradation parameter.

The reference degradation curves are predetermined and can be obtained by data on existing filter arrangements. In some embodiments reference degradation curves can be generated starting from a limited number of experimentally obtained curves. In particular, the predetermined reference curves can be based on historical data of degradation of the filter arrangement.

The expected residual useful life of the filter arrangement is thus predicted on the basis of the similarity of the actual degradation curve with one or more reference degradation curves. A similarity parameter or similarity measure can be calculated, which expresses the similarity of the detected degradation curve of the actual filter arrangement with respect to one or more reference degradation curves. The similarity parameter can be used as a weighing parameter in estimating the residual useful life based on the reference degradation curves.

In some embodiments disclosed herein, the degradation parameter is the pressure loss, i.e. the pressure drop across the filter arrangement. The higher the pressure drop across the filter arrangement, the higher the degradation of the filter.

The filter arrangement can include a single system of filter cartridges or elements, or else a plurality of sequentially arranged filter systems, e.g. of increasing fineness. In an embodiment, in a filter assembly including sequentially arranged filter systems, a filter arrangement includes a single filter system and the pressure drop across said single filter system is detected. It is thus possible to predict the residual useful life of each filter system individually.

According to some embodiments, the method can comprise the following steps: calculating a similarity measure between at least some of the reference degradation curves and the actual degradation curve; calculating the residual useful life of the filter arrangement as a weighted sum of the remaining useful life values of the reference degradation curves, said sum being weighted by said similarity measures.

The similarity parameter or similarity measure can be calculated based on the Euclidean distance between the actual degradation curve of the filter arrangement and the respective reference degradation curve. The similarity parameter for a given reference degradation curve can then be obtained applying a Gaussian kernel.

Other trajectory-based similarity prediction algorithms can be used, such as for instance one based on Dynamic Time Warping (DTW).

The above described data-driven prognostic system using a trajectory-based similarity prediction approach can be combined with a physics-based estimation of the residual useful life of the filter arrangement. A combined approach, using a physics-based and a data-driven system can be particularly useful when the filter arrangement approaches its end of useful life. A combination of the two prognostic approaches results in a more accurate prediction of the actual residual useful life.

According to some embodiments, two estimated residual useful life values, one obtained on the trajectory-based, data-driven similarity approach and the other using a physics-based approach, can be combined such that the second value becomes gradually predominant over the first one as the end of filter life approaches.

According to some embodiments the physics-based prognostic value can be calculated using a regression, such as a linear regression or a quadratic regression, using the values of the degradation parameter detected during the already elapsed period of operation of the filter arrangement.

According to a further aspect, the present disclosure also concerns a gas turbine engine system comprising a gas turbine engine and a turbine inlet air filter system, comprised of at least one filter arrangement; wherein a filter degradation measuring system is combined with the filter arrangement and interfaced with a residual useful life estimation system, configured to perform a method as disclosed.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
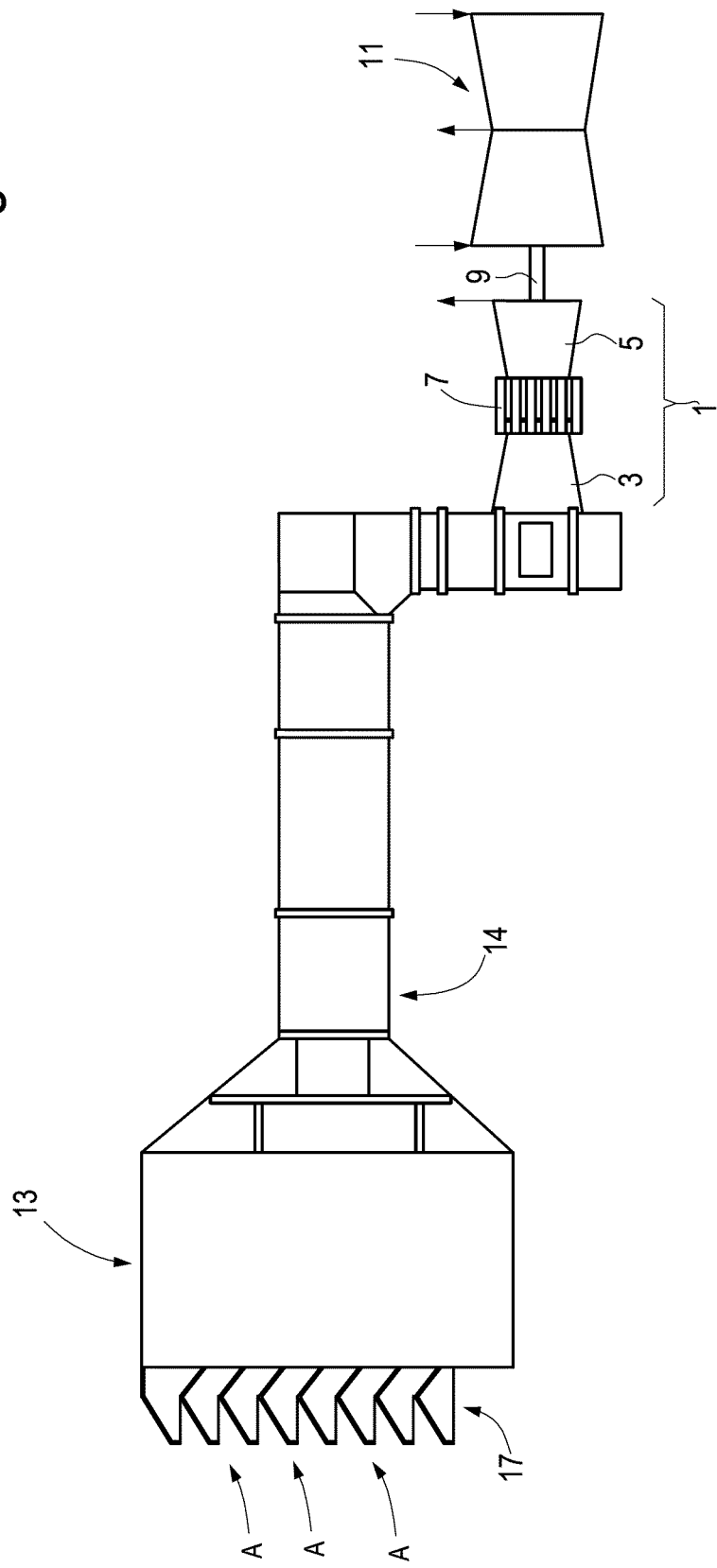
FIG. 1 is a schematic of a gas turbine engine comprised of an air intake arrangement in accordance with embodiment of the present invention.

Referring now to the drawings, in which like numerals refer to like elements throughout the several views, FIG. 1 shows a schematic view of gas turbine engine 1 as may be used herein. The gas turbine engine 1 may include a compressor 3 and a turbine 5. Combustion air A is ingested by compressor 3, compressed and delivered to a combustor 7, where to fuel F is delivered. The air/fuel mixture is ignited and the combustion gases resulting from the combustion are caused to expand in the turbine 5. Enthalpy contained in the combustion gases is partly converted into mechanical power available on the shaft of one or more turbine wheels (not shown) of the turbine 5. A portion of the mechanical power is used to drive the compressor 3 to continue sucking air and delivering compressed air to the combustor 7, to sustain the combustion process. Excess mechanical power is made available on a driving shaft 9. The drive shaft 9 can be mechanically coupled to an external load, e.g. a turbomachine, such as a compressor or a compressor train 11, or else an electric machine, e.g. a generator or a reversible electric machine, i.e. a motor/generator.

Ambient air A entering the compressor 3 is filtered upstream of the compressor to prevent or limit ingress of particulate matter, such as dust or salt, or other impurities. A turbine inlet air filter system 13 can be provided for that purpose. The turbine inlet air filter system 13 containing one or more filter arrangements, is fluidly coupled through a clean air duct 14 to the suction side of the compressor.

Figure 2:
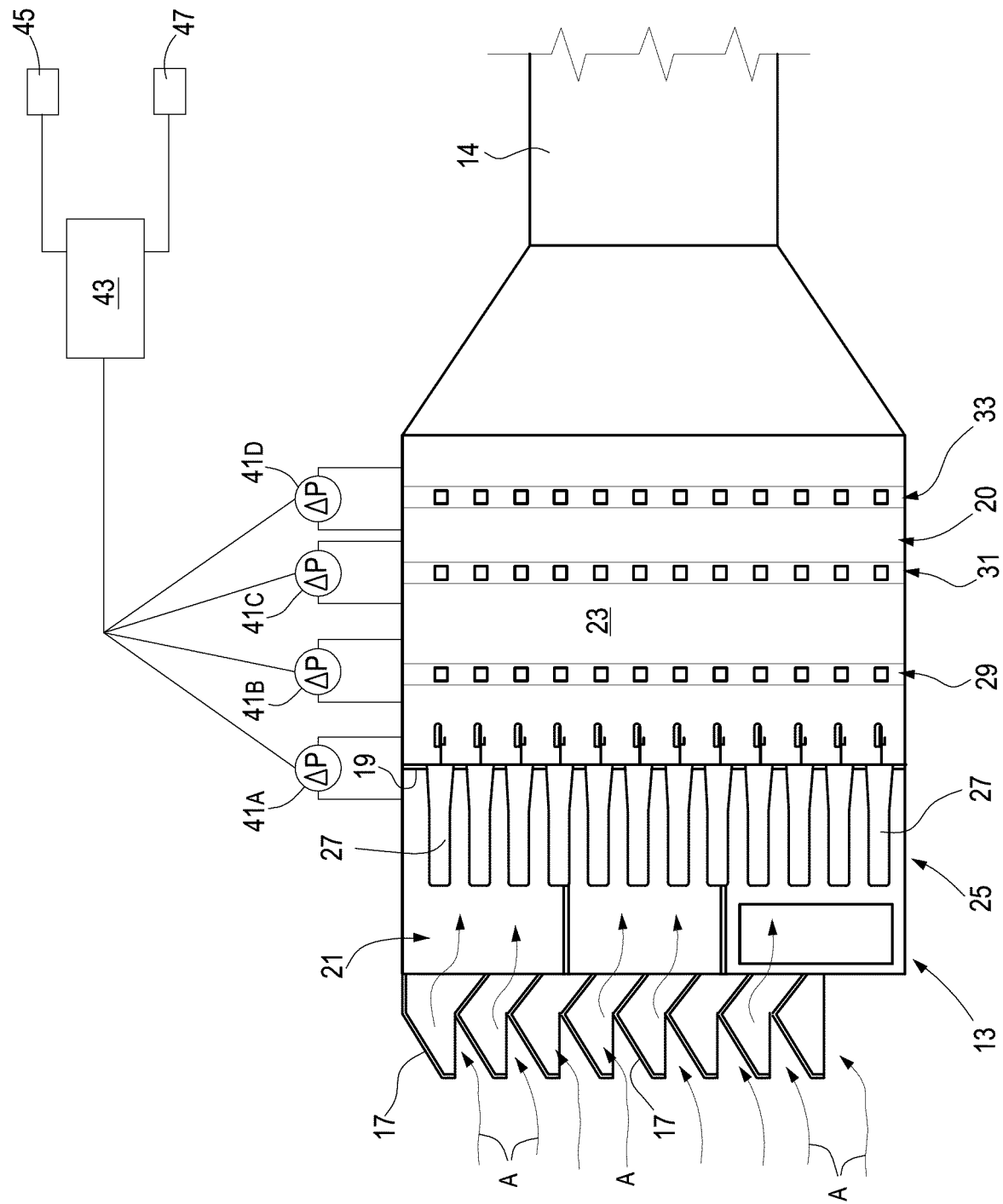
FIG. 2 is a schematic of an exemplary embodiment of a the filter system for the air intake arrangement of FIG. 1.

An exemplary embodiment of the filter system 13 is illustrated in FIG. 2. Weather protection hoods 17 or the like can be arranged at an inlet side of the turbine inlet air filter system 13. The filter system 13 can comprise one or more filter chambers. The filter system 13 can comprise a partition wall 19 arranged inside a filter chamber 20 and dividing the filter chamber 20 in an upstream volume 21 and in a downstream volume 23. The partition wall 19 forms part of a first filter arrangement globally labeled 25. In some embodiments the filter arrangement 25 can be a self-cleaning filter arrangement, e.g. a pulse filter arrangement or pulse jet filter arrangement.

One or more further filter arrangements can be arranged in the downstream volume 23. In the exemplary embodiment of FIG. 2 three filter arrangements 29, 31, 33 are shown in the downstream volume. In other arrangements, more than three or less than three filter arrangements can be provided in the downstream volume 29. In other embodiments the self-cleaning filter arrangement 25 can be omitted, or more than one self-cleaning filter arrangement 25 can be arranged upstream, downstream or intermediate other filter arrangements. Also, the partition wall 19 can be omitted, or additional partition walls, screens, guard filters or the like (not shown) can be arranged in the filter system 13. It shall be understood, the configuration of the filter system 13 shown in FIG. 2 is given by way of non-limiting example only.

As previously noted, the DP through filter will increase during use due to accumulation of particulate matter on the filter. The accumulated particulate matter obstructs the passage of air through the filter arrangement, thus increasing the pressure loss, i.e. the pressure differential across the filter arrangement. The pressure loss, i.e. the pressure drop across the filter arrangement can thus be used as a degradation parameter, which provides information on the degradation of the filter arrangement.

A filter arrangement requires to be changed when the degradation parameter achieves a threshold value, i.e. if the pressure differential, i.e. the pressure loss across the filter arrangement reaches a threshold value.

Upon start of the gas turbine engine, each filter arrangement has a residual useful life (hereunder also indicated as RUL), which can be expressed in operating hours available before the degradation parameter reaches the threshold value.

In some embodiments, a residual useful life prognostic system is provided in combination with one, some or all filter arrangements forming part of the turbine inlet air filter system 13. According to embodiments shown in FIG. 2, each filter arrangement 25, 29, 31, 33 is provided with its own residual useful life prognostic system. Each prognostic system can comprise a differential pressure measuring arrangement, configured for measuring a pressure differential across the respective filter arrangement. The level of saturation of the filter arrangement by particulate matter can be determined by the pressure loss across the filter arrangement. The residual useful life of the filter arrangement can thus be defined in general terms as the available operation time before the level of filter saturation will be such as to cause the pressure differential to reach the threshold value.

In FIG. 2, a plurality of filter degradation measuring systems 41A, 41B, 41C, 41D are schematically shown, one for each filter arrangement 25, 29, 31, 33. Each filter degradation measuring systems can be comprised of a differential pressure measuring arrangement. In other embodiments, differential pressure measuring arrangements can be configured to measure the total differential pressure across two or more sequentially arranged filter arrangements.

According to some embodiments, the residual useful life of a filter arrangement is estimated on the basis of a prognostic approach, which uses sets of predetermined experimentally obtained and/or artificially generated reference profiles of filter degradation, also named reference degradation curves hereunder. These reference profiles of filter degradation are defined as set of data representing a filter degradation parameter as a function of time. These reference profiles are predetermined "a priori" with respect to the actual measurement of the degradation parameter.

As mentioned above, according to some embodiments, the filter degradation parameter is the pressure loss across the filter arrangement. The pressure loss can be expressed in mmH$_2$O or other pressure unit of measurement. Each reference profile of filter degradation or degradation curve can therefore be represented as a curve of pressure loss across the filter arrangement versus time.

Figure 3:
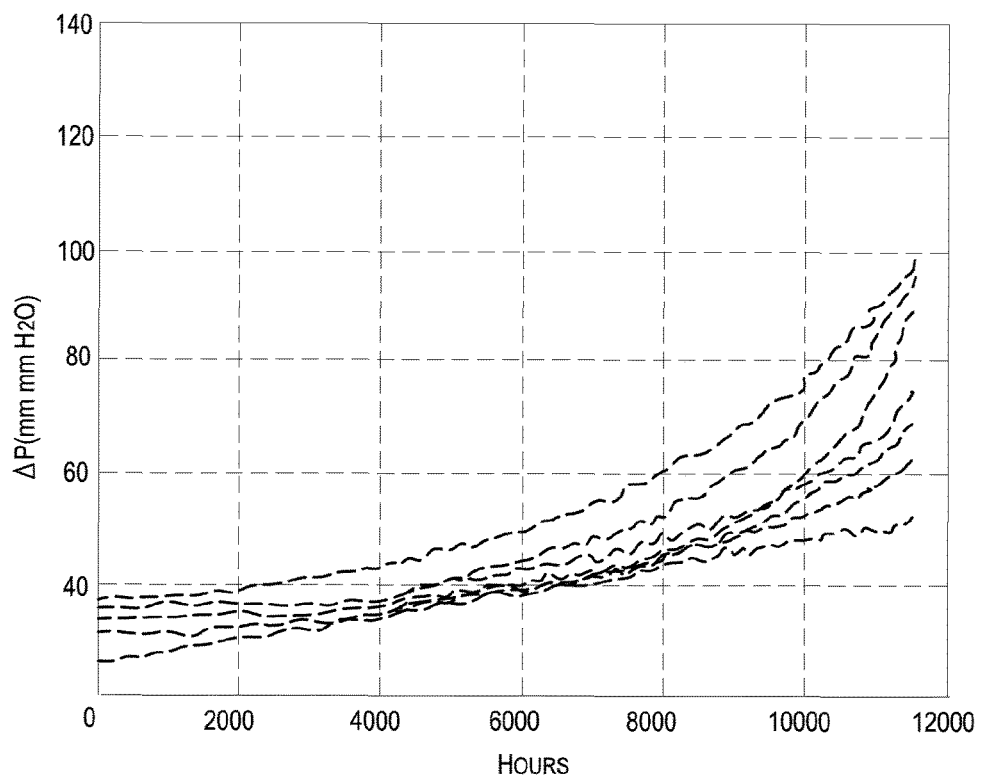
FIG. 3 illustrates experimental filter degradation curves in accordance with embodiment of the present invention.

FIG. 3 illustrates a plurality of reference degradation curves for different filter arrangements, which can be obtained experimentally. Time (expressed in hours) is plotted on the horizontal axis. The difference between the pressure upstream and downstream of the filter arrangement is reported on the vertical axis. The seven exemplary curves plotted in FIG. 3 can represent the experimental data measured on seven different arrangements, e.g. operating in different environmental conditions and/or in different turbine operating conditions.

As will become apparent from the description of the prognostic method of the residual useful life, the larger the number of available reference degradation curves, the more accurate the prediction of the residual useful life will be. If an insufficient number of reference degradation curves is available, or if a larger number of such reference degradation curves is desirable, artificial reference degradation curves can be generated, starting from a relatively small number of experimental curves.

A procedure for generating artificial reference degradation curves can start from observing that each reference degradation curve can be fitted e.g. with a mathematical model, i.e. a mathematical curve fitting the actual reference degradation curve can be defined. According to some embodiments, an exponential model can be used. The exponential model can be defined as follows:

$$\Delta p = a + b \cdot \exp(cT) \qquad (1)$$

where a, b and c are fitting coefficients and T is time. The following table sets forth the values of coefficients a, b and c which can be used in formula (1) to fit the curves of FIG. 3:

|   | Curve 1 | Curve 2 | Curve 3 | Curve 4 | Curve 5 | Curve 6 | Curve 7 |
|---|---------|---------|---------|---------|---------|---------|---------|
| a | 35.75   | 35.60   | 31.98   | 29.50   | 36.70   | 34.33   | 32.93   |
| b | 0.88    | 0.21    | 1.90    | 1.81    | 0.58    | 1.24    | 3.93    |
| c | 0.0003  | 0.0005  | 0.0002  | 0.0003  | 0.0004  | 0.0003  | 0.0002  |

To generate artificial reference degradation curves starting from the seven experimental reference degradation curves plotted in FIG. 3, coefficients (a), (b) and (c) can be manipulated and combined to obtain other sets of coefficients which, once introduced in formula (1) fit artificially generated reference degradation curves.

For instance, for each of the three coefficients (a), (b) and (c) the minimum and maximum values can be calculated:

|   | MIN | MAX |
|---|---|---|
| a | 29.50 | 36.70 |
| b | 0.21 | 3.93 |
| c | 0.0002 | 0.0005 |

New coefficients (a), (b) and (c) can be artificially generated by sampling random numbers uniformly distributed between the minimum and maximum values. Other criteria for artificially generating these parameters can be used, e.g. taking into account the interdependence between the three parameters.

Figure 4:
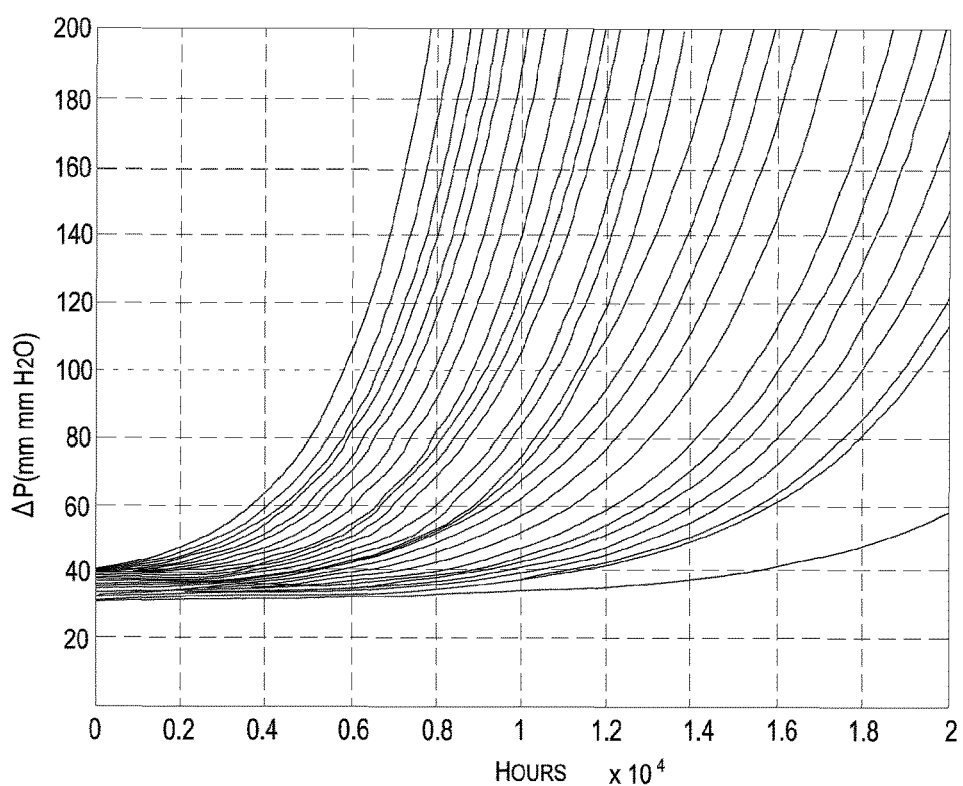
FIG. 4 illustrates a set of predetermined reference filter degradation curves obtained from fitting experimental degradation curves with a physical model and of additional, artificially generated degradation curves in accordance with embodiment of the present invention.

FIG. 4 illustrates by way of example a plurality of reference degradation curves, some fitting the experimental degradation curves of FIG. 3, and some which have been artificially generated by sampling random numbers as described above.

This manner of generating artificial degradation curves can be used e.g. if few experimental data are available, but the general behavior of the filters versus time is known.

If larger amounts of experimental data are available, a greater number of experimental degradation curves can be plotted, which may be sufficient to run the predictive method described hereunder, without the need for artificial curves to be generated.

Other setting models can be used instead of the one expressed by equation (1) above. A further mathematical models can be based e.g. on the following equation:

$$\Delta p = a + bT + cT^2 \quad (1a)$$

Another exemplary embodiment of mathematical setting model can be based on two equations $$\Delta p = \begin{cases} a + b \cdot T, & T \leq T1 \\ a + b \cdot e^{-cT} & T > T1 \end{cases} \quad (1b)$$

Figure 5:
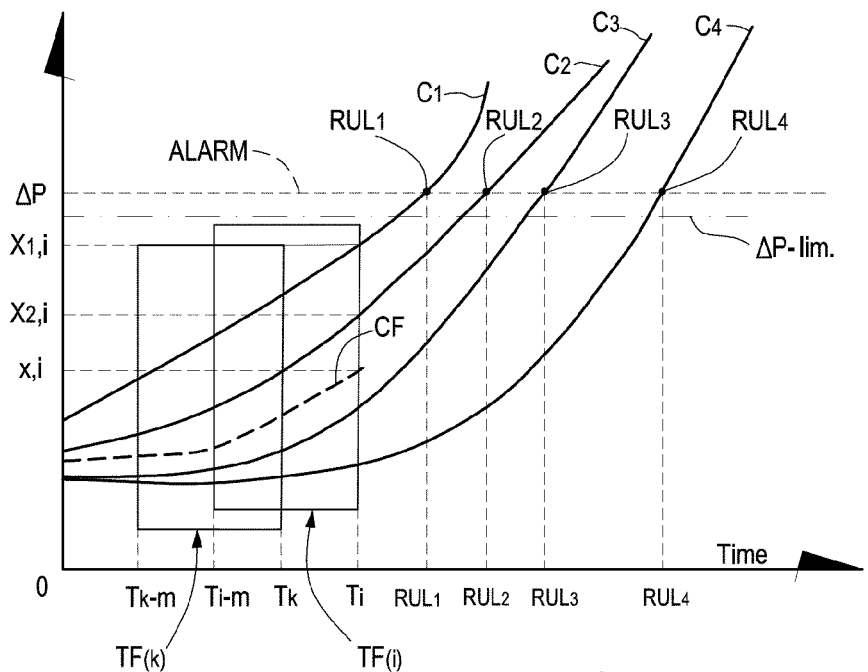
FIGS. 5 to 7 illustrate diagrams explaining the prediction method in accordance with embodiment of the present invention.

For the sake of explanation of the prognostic method disclosed herein, a simplified situation will be considered, where only a small number of reference degradation curves are used. FIG. 5 shows four experimentally or artificially generated degradation curves C1, C2, C3, C4.

A threshold value Δp_alarm of the pressure drop across the filter arrangement is reported on the vertical axis. Upon reaching the threshold value Δp_alarm the filter arrangement requires to be changed. The intersection of the curves C1-C4 with the horizontal "ALARM" line corresponding to the threshold value defines the residual useful life of a filter which behaves according to the respective degradation curve. For instance, the filter whose degradation curve is C1, has a residual useful life $RUL_1$, i.e. it requires replacement after a number of operation hours corresponding to $RUL_1$.

Curve CF is the actual degradation curve of the filter arrangement, the degradation whereof shall be predicted. In the exemplary diagram of FIG. 5 the situation at a generic time instant Ti is depicted. The pressure drop Δp (i.e. the degradation parameter) across the filter arrangement has been measured by the respective pressure measuring arrangement, e.g. 41A, 41B, 41C or 41D (FIG. 2), between the start of the filter operation (T=0) and the actual time Ti. In this time interval, therefore, the actual degradation curve is known. At time Ti the future trend of the degradation curve CF shall be predicted, in order to obtain an estimation of the residual useful life of the filter arrangement, which is the coordinate on the abscissa of the point of intersection between the curve CF and the "ALARM line".

According to some embodiments, the predictive method can be based on a data-driven similarity-based approach. According to these embodiments, at any instant in time (Ti) the shape of the curve CF is predicted based on the shapes of the reference degradation curves Cj (j=1-4 in the example shown in FIG. 5). The similarity of the curve CF with the reference degradation curves Cj is calculated and used to estimate the shape of the curve CF from the time instant Ti to the end of its useful life.

At the generic time instant Ti the values of the measured degradation parameter, i.e. the pressure loss across the filter arrangement, from time T=0 to T=Ti are known. In FIG. 5 the measured degradation parameter for the filter arrangement at time Ti is indicated as $x_i$. The corresponding value of the degradation parameter for a generic one (Cj) of the curves C1-C4 is indicated as $X_{j,i}$.

According to some embodiments, a first step of the predictive method can comprise the calculation of the Euclidean distance between curve CF and the reference degradation curve Cj in a time interval or time frame [Ti−n; Ti]. The calculation can be done point-wise as follows:

$$d_j = \sqrt{\sum_{i=1}^{n}(X_{j,i} - x_i)^2} \quad (2)$$

The calculation can be performed on a sequence of observations which includes n points, i.e. n measurements of the actual pressure loss across the filter arrangement. The time interval or time frame [Ti−n; Ti] can be pre-set and constant throughout the execution of the predictive method. In other embodiments, the time interval or time frame [Ti−n; Ti] can be modified. The coordinates $X_{j,i}$ and $x_i$ on the vertical axis (FIG. 5) for each observation during the time interval between Ti−n and Ti indicate the degradation parameter (pressure loss) for the reference degradation curve Cj and for the actual degradation curve of the filter arrangement and are in the summation of equation (2).

Equation (2) can be repeatedly applied to calculate the Euclidean distance between curve CF and each one of the reference degradation curves Cj (wherein in the example j=1-4).

Next, each Euclidean distance $d_j$ calculated with equation (2) can be transformed into a similarity measure using a Gaussian kernel as follows:

$$w_j = \frac{1}{\sqrt{2\pi h^2}} \exp\left(\frac{-d_j^2}{2h^2}\right) \quad (3)$$

wherein h is the bandwidth of the kernel. Suitable values for the bandwidth h can range between 0.1 and 5 or between 0.2 and 3. These values are by way of example only and different bandwidths can be used. In general, if only a low density of curves is available, a wider bandwidth can be suitable.

Figure 6:
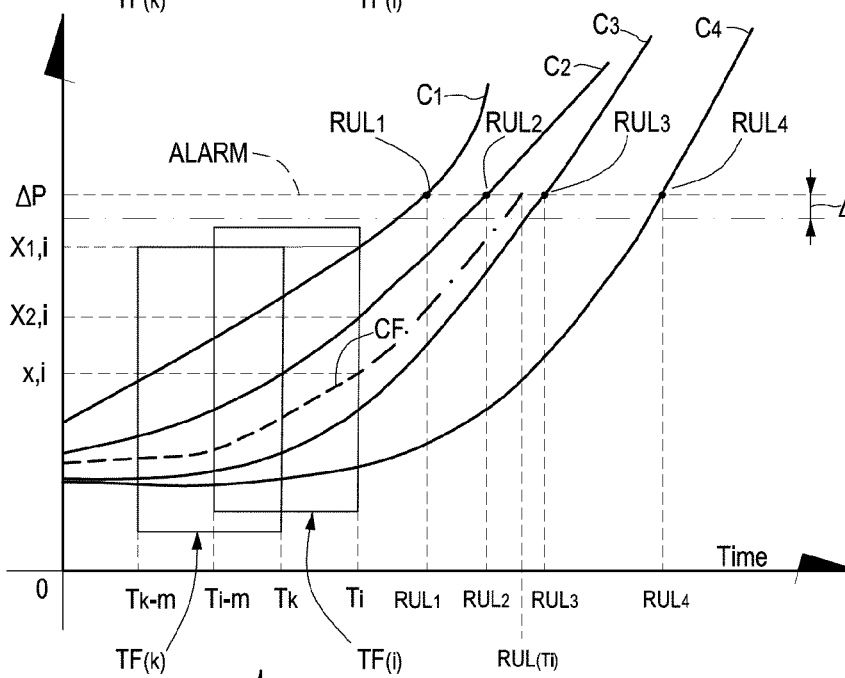

The final residual useful life of the filter arrangement at a time instant Ti is then obtained by a similarity weighted sum based on residual useful life values of the set of used reference degradation curves. Being "m" the number of reference curves used (in the example of FIG. 5 m=4), the estimated residual useful life of the filter arrangement at time instant (Ti) is calculated as follows $$RUL(Ti) = \frac{\sum_{j=1}^{m}(w_j \cdot RUL_j)}{\sum_{j=1}^{m} w_j} \quad (4)$$

wherein $w_j$ are calculated using equation (3) and $RUL_j$ are the residual useful lives corresponding to the reference degradation curves Cj. FIG. 6 shows the same diagram of FIG. 5, wherein the estimated residual useful life RUL(Ti) of the filter arrangement has been plotted.

Practical implementations of the method disclosed so far can use matrices of data where the pressure drop values for the reference degradation curves Cj are stored. Each reference degradation curve Cj can thus be defined by a set of coordinates (Ti, $X_{j,i}$). At each time instant Ti the degradation value detected by the differential pressure measuring arrangement is stored together with the previously detected values and the buffer of data ($x_{i-n}$, $x_i$) are used, together with the stored data defining the reference degradation curves Cj, in equations (2), (4) and (5) to calculate the estimated residual useful life of the filter arrangement.

The coordinates (Ti, $X_{j,i}$) can be the coordinates of points on the real experimentally obtained reference degradation curves, or the coordinates of mathematically defined curves which fit the experimental curves (e.g. obtained with equations (1), (1a) or (1b)), and or coordinates of artificially generated reference degradation curves.

In some embodiments, the coordinates (Ti, $X_{j,i}$) can be calculated rather than stored in a matrix or look-up table form, using the equation fitting or artificially generating the reference degradation curve Cj.

In the schematic of FIG. 2 the differential pressure measuring arrangements 41A-41D are interfaced with residual useful life estimation system, configured for estimating the residual useful life of the filter arrangements 25, 29, 31, 33). The residual useful life estimation system can be comprised of a central control unit 43, which can be suitably programmed for performing the above described prognostic method. Reference number 45 schematically indicates a storage unit, wherein measured values of the degradation parameter can be stored, together with data defining the reference degradation curves. Reference number 47 indicates a generic interface, e.g. a monitor, which provides the operator with information on the predicted residual useful life of the various filter arrangements.

In some embodiments, a global pressure drop across the entire set of filter arrangements or a sub-group thereof can be measured, and used to determine a global residual useful life of the entire group of filter arrangements or a sub-group thereof.

The above described process is repeated sequentially runtime, such that at each instant in time an updated estimation of RUL(Ti) can be obtained. Each time the calculation is performed, a different time frame can be used. In FIGS. 5 and 6 time frames $T_F(i)$ and $T_F(k)$ are shown. Time frame $T_F(i)$ is used at time instant Ti, while $T_F(k)$ was used at time instant Tk. In this manner, the residual useful life of the filter arrangement is re-calculated each time on the basis of a different buffer of data, such that at each calculation the most significant portion of the reference degradation curves Cj is used. The time frame can be e.g. 24 hours.

According to further embodiments, the above described pure data-driven, similarity-based prognostic approach can be modified or corrected when the filter arrangement approaches the end of its useful life. Correction is obtained by combining the data-driven approach with a physics-based approach, wherein the estimation of the residual useful life is obtained by fitting the measured data representing curve CF (FIGS. 5, 6) with a fitting equation, e.g. a linear or a quadratic fitting model. In other words, a regression is applied to the measured degradation parameter data to obtain an estimation of the trend of curve CF towards the end of the filter life.

Different regression methods, either linear or non-linear, can be used.

A hybrid method is thus obtained which is partially data-driven and partially physics-based. It has been noted that in some situations the hybrid method more reliably ensures convergence of the prediction error to 0.

Equations (1), (1a) or (1b) or other linear on non-linear regressions can be used to generate a model of the degradation curve CF, based on a buffer of data obtained by measurement during the period of operation of the filter arrangement.

All measured data of pressure drop across the filter arrangement, collected during the operation period thereof, can be used for fitting the curve and estimate the trend thereof towards final life. In other embodiments, only a reduced frame of the collected data, e.g. those relating to the most recent period of use of the filter arrangement, can be used in the calculation. The time interval used can e.g. be approximately ⅒ of the expected total useful life of the filter. According to some embodiments, measurements of the last 1000 hours or so can be used in the regression.

A hybrid prognostic or estimation method can be designed, wherein the physics-based prediction becomes gradually predominant over the data-driven prediction, as the final life of the filter arrangement is approached. To ensure a smooth transition between the data-driven method and the physics-based method, a combination of the two methods can be used, based on the following formula:

$$RUL(Ti) = f \cdot RUL_{SB}(Ti) + (1-f) \cdot RUL_{PB}(Ti) \quad (5)$$

wherein $$f = \text{median}\left[0; \frac{\Delta p\_alarm - x}{\Delta p\_lim}; 1\right] \quad (6)$$

and wherein $\geq RUL_{SB}$ is the residual useful life estimated on the basis of the pure data-driven, similarity-based approach [i.e. equations (2), (3), (4)]; and $RUL_{PB}$ is the residual useful life estimated on the basis of the regression only, i.e. on the pure physics-based approach, $\Delta p\_lim$ is a limit value of the pressure drop across the filter, which is near the threshold value $\Delta p\_alarm$ that determines the end of the useful filter life, see FIGS. 5 and 6; and x is the pressure drop value, i.e. the degradation parameter, measured at a given time instant T.

Figure 7:
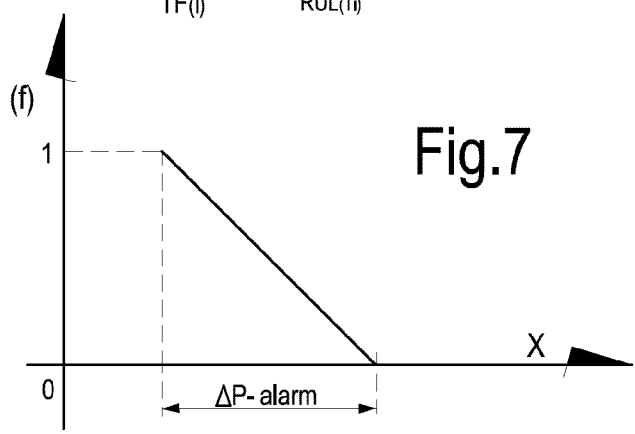

The two estimated values are combined using the parameter (f), which takes the median (intermediate) value between 0, $$\frac{\Delta p\_alarm - x}{\Delta p\_lim}$$

and 1. FIG. 7 shows the value of the parameter (f) as a function of x.

The hybrid method thus operates as follows. The degradation parameter, i.e. the pressure drop or pressure differential across the filter arrangement is constantly or intermittently measured by the respective differential pressure measuring arrangement (41A, 41B, 41C or 41D). As far as the measured degradation parameter x is below Δp_lim the parameter (f) takes the value "1", since this is the median value between 0, $$\frac{\Delta p\_alarm - x}{\Delta p\_lim}$$

and 1. As soon as the measured degradation parameter x reaches and then becomes greater than Δp_lim, the parameter (f) becomes $$f = \frac{\Delta p\_alarm - x}{\Delta p\_lim}$$

The value of (f) gradually increases while the degradation parameter x increases from Δp_lim towards Δp_alarm. Consequently, the weight of the physics-based estimation of the residual useful life $RUL_{PB}$ of the filter arrangement becomes gradually predominant over the data-driven, i.e. similarity-based estimation $RUL_{SB}$.

It has been noted that by combining the two methods in the hybrid method summarized in equation (6) the prediction error converges to 0, this resulting in an extremely accurate prognostic method for determining the residual useful life of the filter arrangement.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method for predicting the residual useful life of an air filter arrangement, the method comprising:
   measuring a degradation parameter of the filter arrangement; and
   estimating the residual useful life of the filter arrangement by comparing a plurality of predetermined reference degradation curves and an actual degradation curve defined by measured values of the degradation parameter.

2. The method of claim 1, wherein the degradation parameter is the pressure loss across the filter arrangement.

3. The method of claim 1, wherein comparing the plurality of predetermined reference degradation curves and the actual degradation curve further comprises applying a similarity-based prediction algorithm.

4. The method of claim 1, further comprising:
   calculating a similarity measure between at least some of the reference degradation curves (Cj) and the actual degradation curve; and
   calculating the residual useful life of the filter arrangement as a weighted sum of the residual useful life values of the reference degradation curves, the sum being weighted by the similarity measures.

5. The method of claim 4, wherein the similarity measure is calculated for a time frame.

6. The method of claim 4, wherein each similarity measure is calculated based on an Euclidean distance between the actual degradation curve of the filter arrangement and the respective reference degradation curve, and wherein the Euclidean distance is transformed into the corresponding similarity measure by means of a Gaussian kernel.

7. The method of claim 6, wherein the Gaussian kernel has a bandwidth between 0.1 and 5.

8. The method of claim 1, wherein when the measured degradation parameter is above a limit value, a physics-based estimated value of the residual useful life is combined with the residual useful life value estimated on the basis of the reference degradation curves.

9. The method of claim 8, wherein the physics-based estimated value of the residual life of the filter arrangement is calculated using a regression applied to the actual degradation curve of the filter arrangement.

10. The method of claim 9, wherein the regression is selected from the group consisting of: a linear regression, a quadratic regression, or a combination thereof.

11. The method of claim 8, wherein the physics-based estimated residual useful life of the filter arrangement and the residual useful life of the filter arrangement estimated on the basis of the reference degradation curves are combined to one another through a weighing parameter, such that the weight of the physics-based estimated value becomes predominant over the residual useful life estimated on the basis of the reference degradation curves as the degradation parameter increases from the limit value to a threshold value indicative of the end of life of the filter arrangement.

12. The method of claim 8, wherein the physics-based estimated residual useful life of the filter arrangement and the residual useful life of the filter arrangement estimated on the basis of the reference degradation curves are combined to one another through the formula wherein $$f = \text{median}\left[0; \frac{\Delta p\_alarm - x}{\Delta p\_lim}; 1\right] \quad (6)$$

and wherein
$RUL_{SE}$ is the residual useful life estimated on the basis of the reference degradation curves
$RUL_{PE}$ is physics-based estimated residual useful life,
Δp_lim is a limit value,
x is the measured degradation parameter.

13. A gas turbine engine system comprising
a gas turbine engine and
a turbine inlet air filter system, comprised of at least one filter arrangement; wherein a filter degradation measuring system is combined with the filter arrangement and interfaced with a residual useful life estimation system, configured to:
measure a degradation parameter of the filter arrangement; and
estimate the residual useful life of the filter arrangement by comparing a plurality of predetermined reference degradation curves and an actual degradation curve defined by measured values of the degradation parameter.

14. The gas turbine engine system of claim 13, wherein the degradation parameter is the pressure loss across the filter arrangement.

15. The gas turbine engine system of claim 13, wherein the system is further configured to apply a similarity-based prediction algorithm.

16. The gas turbine engine system of claim 13, wherein the system is further configured to
calculate a similarity measure between at least some of the reference degradation curves (Cj) and the actual degradation curve; and
calculate the residual useful life of the filter arrangement as a weighted sum of the residual useful life values of the reference degradation curves, the sum being weighted by the similarity measures.

17. The gas turbine engine system of claim 16, wherein the similarity measure is calculated for a time frame.

18. The gas turbine engine system of claim 16, wherein each similarity measure is calculated based on an Euclidean distance between the actual degradation curve of the filter arrangement and the respective reference degradation curve, and wherein the Euclidean distance is transformed into the corresponding similarity measure by means of a Gaussian kernel.

19. The gas turbine engine system of claim 13, wherein when the measured degradation parameter is above a limit value, a physics-based estimated value of the residual useful life is combined with the residual useful life value estimated on the basis of the reference degradation curves.

20. The gas turbine engine system of claim 19, wherein the physics-based estimated value of the residual life of the filter arrangement is calculated using a regression applied to the actual degradation curve of the filter arrangement.

21. A method for predicting the residual useful life of an air filter arrangement, the method comprising:
measuring a degradation parameter of the filter arrangement; and
estimating the residual useful life of the filter arrangement by comparing a plurality of predetermined reference degradation curves and an actual degradation curve defined by measured values of the degradation parameter,
wherein when the measured degradation parameter is above a limit value, a physics-based estimated value of the residual useful life is combined with the residual useful life value estimated on the basis of the reference degradation curves, and
wherein the physics-based estimated residual useful life of the filter arrangement and the residual useful life of the filter arrangement estimated on the basis of the reference degradation curves are combined to one another through the formula $$RUL(Ti) = f \cdot RUL_{SS}(Ti) + (1-f) \cdot RUL_{PB}(Ti) \qquad (5)$$

wherein $$f = \mathrm{median}\left[0;\ \frac{\Delta p\_\mathrm{alarm} - x}{\Delta p\_\mathrm{lim}};\ 1\right] \qquad (6)$$

and wherein
$RUL_{SE}$ is the residual useful life estimated on the basis of the reference degradation curves
$RUL_{PE}$ is physics-based estimated residual useful life,
$\Delta p\_\mathrm{lim}$ is a limit value,
x is the measured degradation parameter.

* * * * *